(12) United States Patent
Srinivasaraghavan (10) Patent No.: US 9,348,978 B2
(45) Date of Patent: May 24, 2016

(54) UNIVERSAL CONTENT TRACEABILITY

(75) Inventor: Haripriya Srinivasaraghavan, Bangalore (IN)

(73) Assignee: Novell, Inc., Provo, UT (US)

( * ) Notice: Subject to any disclaimer, the term of this patent is extended or adjusted under 35 U.S.C. 154(b) by 634 days.

(21) Appl. No.: 13/014,770

(22) Filed: Jan. 27, 2011

(65) Prior Publication Data

US 2012/0197952 A1    Aug. 2, 2012

(51) Int. Cl.
*G06F 17/30* (2006.01)
*G06F 21/10* (2013.01)

(52) U.S. Cl.
CPC .......... *G06F 21/10* (2013.01); *G06F 17/30728* (2013.01); *G06F 2221/0737* (2013.01)

(58) Field of Classification Search
CPC ............. G06F 17/30728; G06F 21/10; G06F 2221/0737
USPC ................................. 707/825, 769
See application file for complete search history.

(56) References Cited

U.S. PATENT DOCUMENTS

| | | | | |
|---|---|---|---|---|
| 6,285,999 | B1 * | 9/2001 | Page | ................. G06F 17/30728 |
| 6,691,229 | B1 | 2/2004 | Nelson | |
| 8,554,021 | B2 * | 10/2013 | Kletter | ............... G06K 9/00456 |
| | | | | 382/100 |
| 8,620,872 | B1 * | 12/2013 | Killalea | ............... G06F 17/2211 |
| | | | | 707/687 |
| 2002/0168082 | A1 | 11/2002 | Razdan | |
| 2003/0093790 | A1 * | 5/2003 | Logan et al. | ..................... 725/38 |
| 2003/0217052 | A1 * | 11/2003 | Rubenczyk et al. | ............... 707/3 |
| 2005/0060643 | A1 * | 3/2005 | Glass | .................... G06F 17/241 |
| | | | | 715/205 |
| 2007/0050409 | A1 | 3/2007 | Bugir et al. | |
| 2007/0067427 | A1 | 3/2007 | Bugir et al. | |
| 2007/0266022 | A1 * | 11/2007 | Frumkin et al. | .................. 707/5 |
| 2008/0059456 | A1 * | 3/2008 | Chowdhury | ...... G06F 17/30675 |
| 2008/0244038 | A1 * | 10/2008 | Martinez | ...................... 709/218 |
| 2008/0250392 | A1 | 10/2008 | Petri | |
| 2008/0270991 | A1 * | 10/2008 | Zeidman | ................... G06F 8/71 |
| | | | | 717/126 |
| 2009/0106110 | A1 * | 4/2009 | Stannard et al. | ................ 705/14 |
| 2009/0313271 | A1 * | 12/2009 | Zeidman | .................. G06F 8/71 |
| 2010/0161575 | A1 * | 6/2010 | Basso et al. | ................... 707/705 |
| 2012/0136853 | A1 * | 5/2012 | Kennedy | ........... G06F 17/30038 |
| | | | | 707/723 |

* cited by examiner

*Primary Examiner* — Jorge A Casanova
(74) *Attorney, Agent, or Firm* — Schwegman, Lundberg & Woessner, P.A.

(57) ABSTRACT

Techniques for universal content traceability are presented. A piece of content is tagged with one or more content identifiers and with a unique instance identifier. The content also is tagged with content and instance-level metadata. The tagged information is maintained with the document and separately from the document in a centralized or distributed database system or table. As operations are performed on the content, the tagged information may be updated as necessary. The content can then use the tagged information in connection with the database to trace its origins and history during its lifecycle.

20 Claims, 4 Drawing Sheets

UNIVERSAL CONTENT TRACEABILITY

BACKGROUND

Nearly every piece of information generated today is captured in electronic format. Businesses record information with respect to operating their businesses and actions of their customers. Enterprises record internal activities in a variety of electronic formats. Even individuals and their thoughts and opinions are now captured on a variety of social networking sites or captured via text messages on their smart phones. In fact, very little information exists in today's world that is not in some form captured at some point in its existence in electronic format.

Because of this scenario, search engines are now big business. For example, GOOGLE™ is one of the most successful companies of today and its primary benefit and focus is searching through a sea of electronic information to return relevant results quickly to a user. The speed with which GOOGLE™ grew to its present size is astonishing and mind boggling.

Yet, companies, such as GOOGLE™ and others have largely focuses on indexing and organizing information to improve search results and the response times to searches. Very little effort has been made to keep and maintain linkages between related content for purposes of content tracing.

Furthermore, with the explosion of this digital information and multiple copies and derivatives of that information, which is generated and transferred into multiple places nearly instantaneously around the globe, it is very difficult to trace the origin of a particular piece of information. Because of this, it becomes very difficult to: consolidate similar information, find the latest information in a related set of documents, find out how a particular document has derived content from another, etc.

SUMMARY

Techniques for universal content traceability are presented. More particularly, and in an embodiment, a method for content traceability is described.

More particularly, a piece of content is identified and the piece of content is assigned one or more content identifiers to the piece of content. A unique instance identifier is then generated for the piece of content. Then, content metadata and instance metadata is provided for the piece of content. Finally, the one or more content identifiers, the instance identifier, the content metadata, and the instance metadata are recorded in a database for subsequent traceability of the piece of content.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

As used herein, unless noted otherwise, "content" refers to digital information that is logically associated with one or more categories of information. Content resides in electronic files in a variety of formats, such as text, audio, images, video, graphics, or various combinations or all of these formats. A single file can have multiple different content types and formats of content.

Various embodiments of this invention can be implemented in existing operating architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured and programmed to specifically perform the processing of the methods and systems presented herein. Moreover, the methods and systems are implemented, reside, and are programmed within a non-transitory computer-readable storage media or machine-readable storage medium and are processed on the machines (hardware processors) configured to perform the methods. Also, as used herein, a "machine" refers to a physical computing device, such as a "multicore processor machine."

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
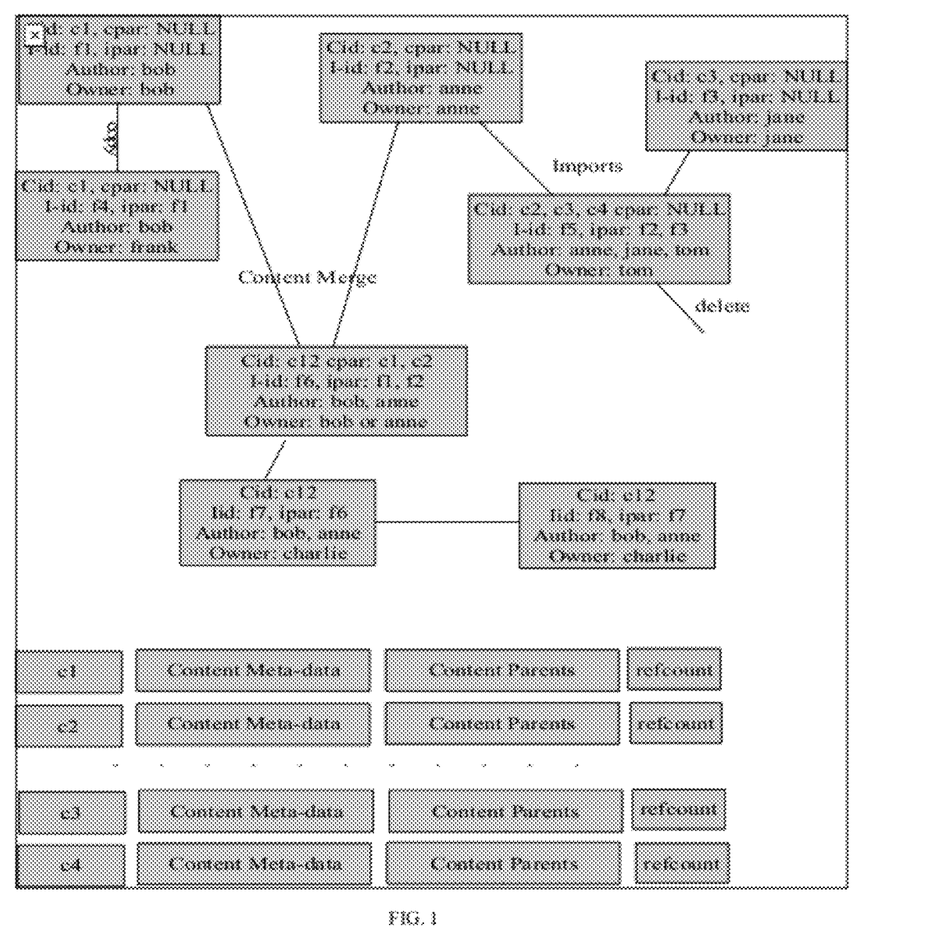
FIG. 1 is a diagram of an example data model for a content traceability system, according to an example embodiment.

FIG. 1 is a diagram of an example data model for a content traceability system, according to an example embodiment. The content traceability system is implemented in a machine-accessible and non-transitory computer-readable medium as instructions that execute on one or more processors and are programmed within the one or more processors (machines, computers, hardware processors, etc.). The machines are specifically configured and programmed to process the content traceability system. Furthermore, the content traceability system can be operational over and process within a network. Any such network may be wired, wireless, or a combination of wired and wireless.

A discussion of various embodiments of the invention is now presented in view of the FIG. 1 and the content traceability system.

Various embodiments discussed herein teach techniques for achieving a universal content traceability system. Documents are tagged with content traceability information, which gets retained and modified as per needed on the copies and derivatives of the original document even though the content may travel from one system to another.

In the universal content traceability system (an example of which is shown in the FIG. 1 and again below with reference to the FIG. 4) each file has additional meta-data attributes, which store additional information about the content traceability of a file. In this system, each file has an externally addressable reference—this could be a URI (Uniform Resource Identifier) or something similar. In addition to this, each file have two externally addressable identities that are stored as part of the meta-data: a contentID (referred to as Cid in the FIG. 1) and an instanceID (referred to as I-id in the FIG. 1).

ContentID refers to the content that is actually represented by that file, which is stored as part of the content-metadata. This means multiple copies of a file have a same ID for the contentID, and the ID refers to the content meta-data that is stored in the system.

InstanceID refers to the instance of the file, which is stored as an instance meta-data. This means that multiple copies of an original file have distinct instanceIDs.

Content meta-data includes information such as copyright, author, creation time for that content, mutability flags, etc.

Instance meta-data comprises things such as owner, rights, and other things that a normal instance can have. The instance meta-data can be likened to regular but enhanced file meta-data and the instance ID can be constructed based on a pathname or other information such as inodes, which are already distinct for every file.

With this information a universal single-rooted content system using these constructs can be modeled within a non-transitory computer-readable storage medium, an example of which is shown in the FIG. 1.

The following are some behaviors of the system, when the following operations are executed against content for: content creation, copying content, importing or transferring content, modifying content, and deleting content. For the operations the following processing takes place:

Content Creation: this is a file created from scratch (such as new text or drawing, new video, new photos, combinations of these things, etc.), which receives a new contentID from the content system. In order to qualify as "new" content, the file is created in a system, imported from a raw format, etc.

File Copy: this is when a file is copied, the contentID is copied to the copied file, and content meta-data is copied to the copied system, and a new instanceID and instance meta-data are generated. The instance also points back to the instanceID of the file instance from which this particular instance was created. Thus, a parent-child relationship is established, managed, and maintained with respect to both the content and the instances.

File Import into Another File: this is when the whole or a part of a file is imported into another file; the contentID, associated with the file from which this imported occurred is added to the list of contentIDs for the file that is receiving the imported file. So, the content meta-data is also added along with the existing content meta-data for that file. In addition information is added to the content meta-data specifying which portion of content is copied into this particular instance.

When a File is Copied/Imported into Another File: the mutability flags are checked by the system to ensure that the content is mutable—is allowed to be copied into another file and thus can be muted into another piece of content.

When a Part of the File Content is Edited or Deleted: this is based on the content meta-data, the system decides whether to retain or remove the particular content ID and content meta-data to that file.

Cut and Paste: clip-boards and other methods of cut and paste can participate in this system by reading, and then sharing the contentID and content meta-data of the original content in question.

Composite Content Scenario

Though content is only created on the first fundamental creation of content, users are given the option of voluntarily creating composite content. This can happen when multiple authors develop content but want to put it together into a single piece of logically assembled content. In this case, users can voluntarily merge the contentIDs and content meta-data into one piece of composite content. Content owners may also choose to modify certain mutable portions of content meta-data, such as assigning authorship to a different person or company, etc. This can; however, just be done by the content owners. Once a piece of composite content is created further copies of the resulting content file just refer to the composite contentID, but the content system maintains the information that this piece of composite content is actually created out of one or more original contentIDs.

Template Scenarios

Document templates, such as a design document template or a sales presentation template, participate in the content creation by providing a format, but not so much in the actual content itself. In a case of such template usage, the content author of the template can create a contentID, which refers to a template of content, which is a special purpose type of content. Documents using the template content inherit the template contentID as one of the parents, but this is tagged as a Template ContentID, thus distinguishing it from the other contentIDs in any subsequent descendent pieces of content.

Extending the Traceability Functionality Using External Searching

In the event that a file is imported as "new" content into the system from an external system, which does not participate by providing the contentID and other information, the content traceability systems, described herein, can resort to an external search and use the information to compare and find possible ancestors to a particular content—this can be based on policy, and the like. A particular percentage of matches can be used with an earlier identified timestamp, or this can be based on heuristics—keywords search, a similarity search, etc. In this situation, the contentID can be tagged with a degree of uncertainty. When users trace the ancestry of a piece of content, potential matches can show up as possible ancestors with a related degree of uncertainty or as unconfirmed ancestors.

The content database does not always have to be a single centralized database but could be something which is distributed in nature. Although it is noted that in some embodiments a single centralized database system can be used as well. In a distributed database scenario, based on which contentIDs are in use, the individual file or document servers, which participate in the system can acquire and/or cache those parts of the content data-base that are needed or that they are responsible for.

Uses of the Content Traceability System

Given any instance of content, one can predictably back trace and find the various origins for the current content being traced. This is useful in the following ways:

One can find the genealogy of content that someone is accessing, and can trace back to multiple starting points; thus, giving an accurate picture of the origins of the content being traced.

The operation of referencing is not something that has to be manually done by an author or an owner of a file, but is inbuilt into the system and performed automatically and dynamically without manual intervention. For instance, where there is a single parent in terms of the instance being processed, and where the content IDs match completely, and the author(s) are the same, the current instance is usually a subsequent version of the previous instances. This can be used to automatically create a versioning system for the instances.

When there are long lists of files, one can easily skim to previous versions and the content ancestor(s) of that file to retain or discard versions, which are not of interest.

One can track the contentID reference count (referred to as "refcount" in the FIG. 1) for each piece of content. Files with lots of content backlinks (contentIDs with higher reference count) are important files mostly because lots of content has been created out of them. So, this can be used to rank content in terms of importance. Note that even though people may be using different copies or different mutations of a single piece of content, the system herein correctly traces back into the original content reference count.

Example Implementation Scenarios

As previously discussed, the content database can be implemented as a local centralized relational database or as a distributed database that is distributed among the participating file-systems or other systems in the network, with a network or web-based front-end which allows each element to be accessed as an independent URI.

The contentID and instanceID can be implemented as URIs to the content database entries (contentIDs) and as URIs to the filenames (instanceIDs), respectively. They can also be implemented as local Ids—indexed to the database entry or to the local file, but having them as externally addressable increases the ease of the content being identified and accessed across multiple systems.

The storing of the contentIDs and instanceIDs can be achieved using extended attributes on POSIX (Portable Operating System Interface) file-systems. This ensures that the backup, migration and other services preserve these extra attributes on those files. The attributes can be made into standard POSIX xattrs (extended and customized attributes) so that they become a standard for POSIX file-systems.

Today within the industry, there is no universal system to tag and trace the history of content. The systems and techniques discussed herein make it possible to keep the content related information and further to use that information to provide complete information about a file's content ancestry.

Apart from finding the lineage of a particular content, the systems and techniques discussed herein can also be used to find additional relationships between content such as—popular content, the level of mutation of a content, and/or independent creation of similar content without a seeming link from one piece of content to the other piece of content.

The systems and techniques discussed herein can also be applied to the problem of consolidating content when a large portion of documents are similar, but allowing one to choose the most used, or most recent content rather than the most used or most recent file—which may not be the same.

Moreover, the systems and techniques herein can be applied to such techniques as detecting data duplication.

In addition, the systems and techniques herein can be applied to copyright, license, and IP (Intellectual Property) violations by identifying the possible ancestors of a particular piece of potentially infringing content.

Still further, the systems and techniques herein can be used to tag popular content to discern in automated fashion trends.

Additionally, the systems and techniques herein can be used to easily find the extent to which a piece of content has morphed, and thereby help someone find the actual original source of the content.

Figure 2:
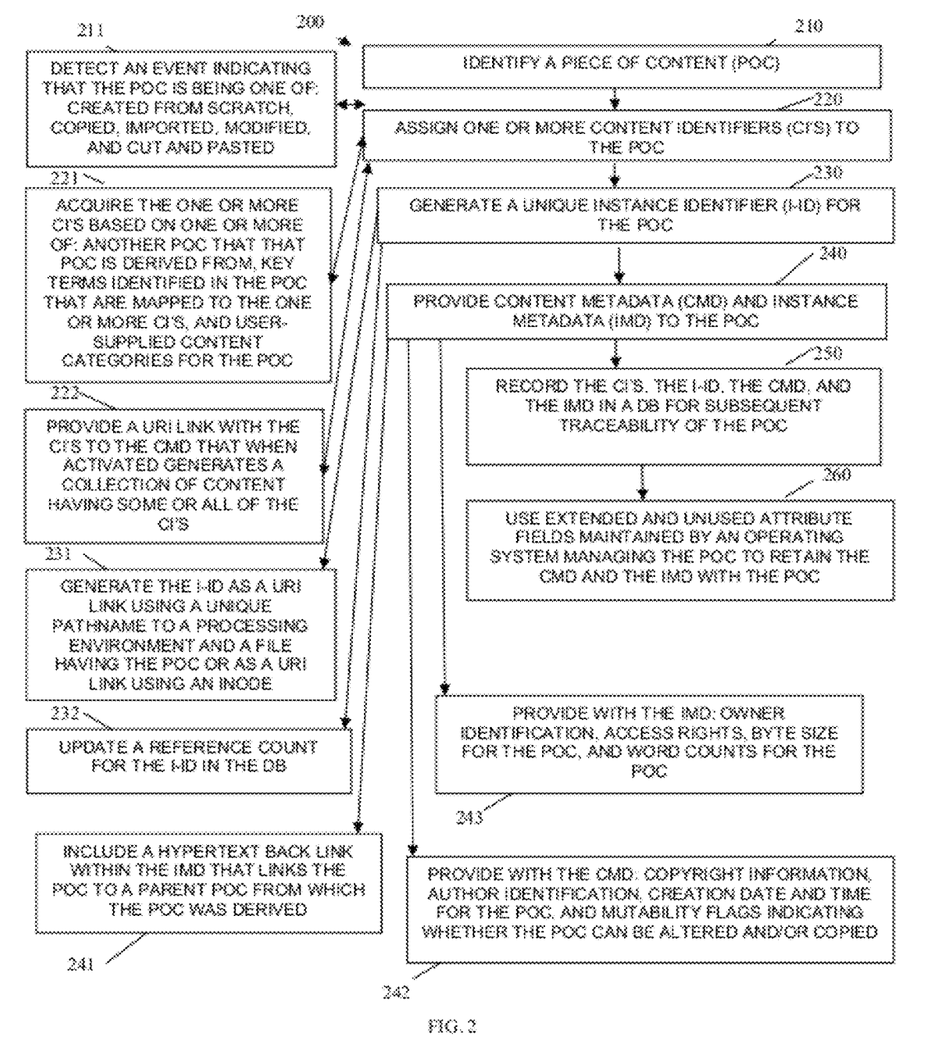
FIG. 2 is a diagram of a method for establishing a content traceability system, according to an example embodiment.
Figure 3:
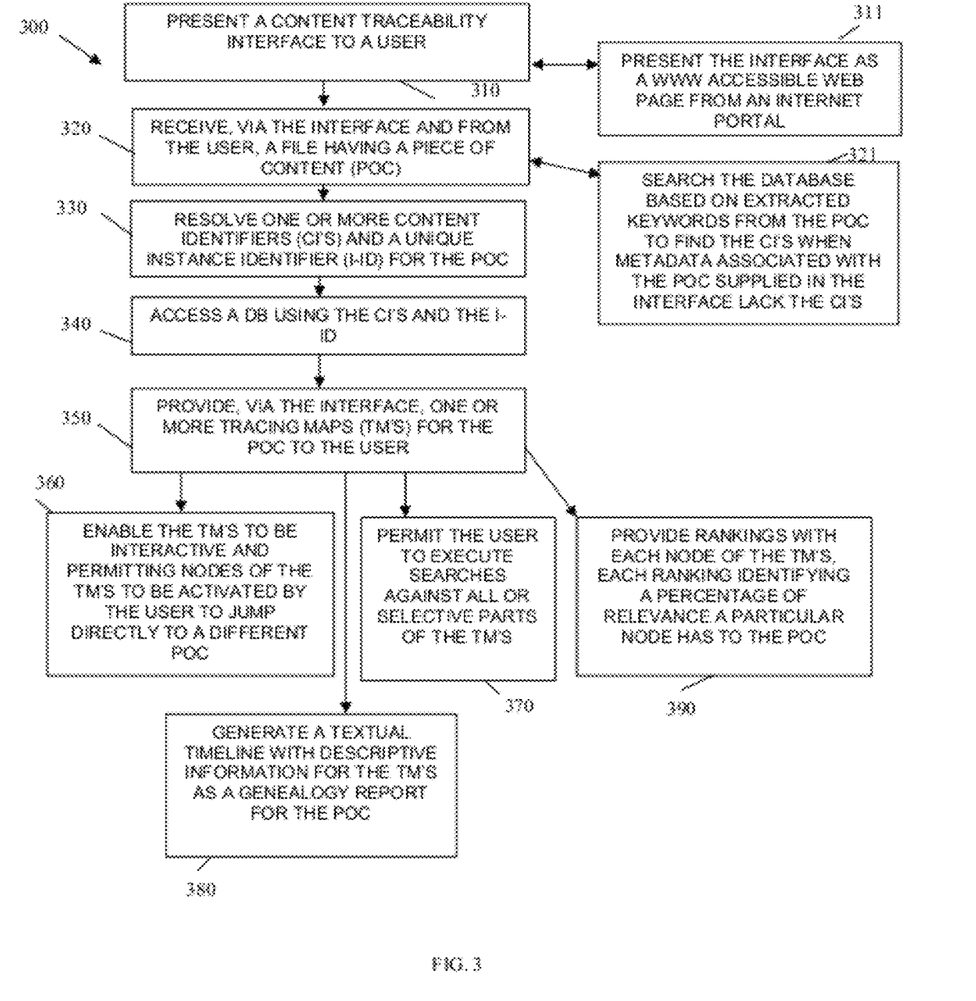
FIG. 3 is a diagram of another method for operating a content traceability system, such as the one established by the FIG. 1, according to an example embodiment.
Figure 4:
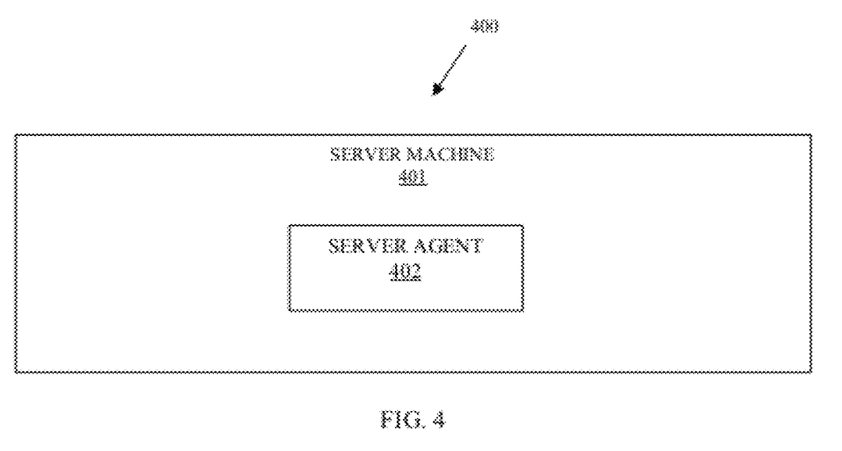
FIG. 4 is a diagram of content traceability system, according to an example embodiment.

With this initial presentation of a content traceability system discussed, additional features are now presented with reference to the FIGS. 2-4.

FIG. 2 is a diagram of a method 200 for establishing a content traceability system, according to an example embodiment. The method 200 (hereinafter "content establishment service") is implemented in a machine-accessible and non-transitory computer-readable medium as instructions that execute on one or more processors and are programmed on the one or more processors (machines, computers, processors, etc.). The machine is specifically configured and programmed to process the content establishment service. Furthermore, the content establishment service can be operational over and process within a network. Any such network may be wired, wireless, or a combination of wired and wireless. In an embodiment, the network is the Internet.

At 210, the content establishment service identifies a piece of content. Identifying of the content can occur in a variety of manners. In addition, a "piece of content" may be used synonymously herein with just the word "content." Again, content can come in a variety of formats and is encapsulated in an electronic file.

According to an embodiment, at 211, the content establishment service detects a raised event that indicates that the piece of content is being: created from scratch, copied, imported, modified, and/or cut and pasted. The raised event can occur from a processing agent within a processing environment of where the content is being altered. That agent communicates with the content establishment service over a network, such as but not limited to the Internet.

At 220, the content establishment service assigns one or more content identifiers to the piece of content. That is, each content category associated with the piece of content includes its own unique content identifier. Again, as discussed above, each content identifier is unique to a particular content category or classification, such that a single piece of content can include multiple content identifiers.

In an embodiment, at 221, the content establishment service acquires the one or more content identifiers based on one or more of: another piece of content that the piece of content being processed was derived from, key terms included in the piece of content that are mapped to specific ones of the one or more content identifiers, and/or user-supplied content categories for the piece of content that are also mapped to the one or more content identifiers.

At 230, the content establishment service generates a unique instance identifier for the piece of content. This identifier is unique to the piece of content.

According to an embodiment, at 231, the content establishment service generates the instance identifier as a URI link, the URI constructed using a unique pathname to a processing environment and file having the piece of content or the URI is constructed using an inode having the file for the piece of content. This provides a mechanism for directly and externally referencing and acquiring the piece of content.

In another situation, at 232, the content establishment service increments a reference count for the instance identifier within the database. That is, a reference count for a piece of content is kept such that each count value reflects a unique instance for the piece of content.

At 240, the content establishment service provides content metadata and instance metadata to the piece of content.

According to an embodiment, at 241, the content establishment service includes a hypertext back link within the instance metadata that piece of content to a parent piece of content from which the piece of content being processed was derived.

In another case, at 242, the content establishment service provides the content metadata with copyright information, author identification information, creation date and time for the piece of content, and one or more mutability flags that indicate whether the piece of content may permissibly be altered and/or copied.

In yet another situation, at 243, the content establishment service provides with the instance metadata a variety of information, such as but not limited to: owner identification, access rights, byte size of the piece of content, word counts for the piece of content, and others.

At 250, the content establishment service includes the content identifiers, the instance identifier, the content metadata, and the instance metadata within a database for subsequent traceability of the piece of content.

In an embodiment, at 260, the content establishment service uses extended and unused attribute fields maintained by an operating system managing the piece of content to maintain the content metadata and the instance metadata.

FIG. 3 is a diagram of another method 300 for operating a content traceability system, such as the one established by the FIGS. 1-2, according to an example embodiment. The method 300 (hereinafter "content tracing service") is implemented in a machine-accessible and non-transitory computer-readable medium as instructions that execute on one or more processors and are programmed on the one or more processors (machines, computers, processors, etc.). The machine is specifically configured and programmed to process the content tracing service. Furthermore, the content tracing service can be operational over and process within a network. Any such network may be wired, wireless, or a combination of wired and wireless. In an embodiment, the network is the Internet.

The content tracing service presents a processing perspective of an already established content traceability system, such as what was described and established above with the discussions of the FIGS. 1-2.

At 310, the content tracing service presents a content traceability interface to a user. This can be achieved in a variety of manners.

For example, at 311, the content tracing service presents the interface as a world-wide web (WWW) accessible web page from an Internet portal. The user simply types in a URI or activates a saved URI to access the Internet portal and the web page having the interface, which is rendered on the page for the user to interact with.

At 320, the content tracing service receives, via the interface and from the user a file having a piece of content that the user wants to trace via the interface.

According to an embodiment, at 321, the content tracing service searches a database based on extracted keywords from the piece of content for purposes of identifying content identifiers for the piece of content. This occurs when the supplied piece of content lacks metadata that includes the content identifiers, so that the content tracing service can resolve the needed content identifiers via keyword searching.

At 330, the content tracing service resolves one or more content identifiers and a unique instance identifier for the piece of content. One way to do part of this was discussed above with the processing associated with the embodiment described at 321 (immediately above).

At 340, the content tracing service accesses a database using the content identifiers and the instance identifier.

At 350, the content tracing service provides, via the interface, one or more tracing maps for the piece of content to the user.

According to an embodiment, at 360, the content tracing service permits the tracing maps to be interactive, within the interface, so that the user can activate specific nodes (which are links) to directly jump to a different piece of content defined in the tracing maps.

In another case, at 370, the content tracing service permits the user to execute customized searches against all of the tracing maps or selective portions of the tracing maps. So, the user can selectively search the tracing maps for specific versions or origins of the piece of content.

In yet another situation, at 380, the content tracing service generates a textual timeline with descriptive information for the tracing maps to produce a genealogy report for the piece of content in an automated fashion. This is particular useful for researches.

In another embodiment, at 390, the content tracing service provides rankings with each node of the tracing maps. Each ranking representing a percentage of relevance that a particular node to which the ranking is assigned relates to the piece of content.

FIG. 4 is a diagram of content traceability system 400, according to an example embodiment. The content traceability system 400 is implemented within a processor machine (hardware device can be a multicore processor machine as well). The machine is specifically configured and programmed to process other aspects of the content traceability system 400. Furthermore, the content traceability system 400 can be operational over and process within a network. Any such network may be wired, wireless, or a combination of wired and wireless. In an embodiment, the network is the Internet.

In an embodiment, the content traceability system 400 implements, inter alia, the processing discussed above with respect to the FIGS. 1-3.

The content traceability system 400 includes a server machine 401 and a server agent 402. Each of these components and their interactions with one another will now be described below in turn.

The server machine 401 includes multiple processors and is configured with, programmed with, and executes the server agent 402. The server agent 402 is implemented, resides, and is programmed in a non-transitory computer-readable medium and executes on the server machine 401. The server machine 401 is configured to interact with one or more client agents executing on one or more client machines over the network.

The server agent 402 is configured to interact with each client agent to supply each piece of content being manipulated on a particular client machine with one or more content identifiers, a unique instance identifier, content metadata, and instance metadata. Additionally, the server agent 402 is further configured to maintain a database to link the content identifiers and instance identifiers to other pieces of content managed in the database to create traceability for content. Example features of the server agent 402 were presented above with reference to the FIGS. 1-3.

According to an embodiment, the server agent 402 is further configured to generate tracing maps from the database for a given piece of content.

Additionally, the server agent 402 is configured to interact with an interface presented by the server machine 401 to a user to receive the given piece of content and to present the tracing maps within the interface.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
    identifying a piece of content;
    assigning one or more content identifiers to the piece of content;
    generating a unique instance identifier for the piece of content, the unique instance identifier unique to a particular copy of the piece of content and the one or more content identifiers are assigned to all copies of the piece of content, the unique instance identifier constructed based on a pathname for the particular copy of the piece of content and the pathname including an inode for the particular copy of the piece of content;
    providing content metadata and instance metadata to the piece of content; and
    recording the one or more content identifiers, the instance identifier, the content metadata, and the instance metadata in a database for subsequent traceability of the piece of content, wherein a total number of backlinks for any given piece of content is used for ranking that given piece of content, and when an imported different piece of content from an external system is detected performing a search and identifying a percentage of content matches for search results from the search as ancestors for the different piece of content, each ancestor identified as an unconfirmed ancestor to the different piece of content.

2. The method of claim 1, wherein identifying further includes detecting an event indicating that the piece of content is being one of: created from scratch, copied, imported, modified, and cut and pasted.

3. The method of claim 1, wherein assigning further includes acquiring the one or more content identifiers based on one or more of: another piece of content that this piece of content is derived from, key terms identified in the piece of content that are mapped to the one or more content identifiers, and user-supplied content categories for the piece of content.

4. The method of claim 1, wherein assigning further includes providing a uniform resource identifier (URI) link with the one or more content identifiers to the content metadata that when activated generates a collection of content having some or all of the one or more content identifiers.

5. The method of claim 1, wherein generating further includes generating the instance identifier as a Uniform Resource Identifier (URI) link using a unique pathname to a processing environment and a file having the piece of content.

6. The method of claim 1, wherein generating further includes updating a reference count for the instance identifier in the database.

7. The method of claim 1, wherein providing further includes including a hypertext back link within the instance metadata that links the piece of content to a parent piece of content from which the piece of content was derived.

8. The method of claim 1, wherein providing further includes providing with the content metadata: copyright information, author identification, creation date and time for the piece of content, and mutability flags indicating whether the piece of content can be altered and/or copied.

9. The method of claim 1, wherein providing further includes providing with the instance metadata: owner identification, access rights, byte size for the piece of content, and word counts for the piece of content.

10. The method of claim 1 further comprising, using extended and unused attribute fields maintained by an operating system managing the piece of content to retain the content metadata and the instance metadata with the piece of content.

11. A method implemented in a non-transitory machine-readable storage medium and processed by one or more processors configured to perform the method, comprising:
    presenting a content traceability interface to a user;
    receiving, via the interface and from the user, a file having a piece of content;
    resolving one or more content identifiers and a unique instance identifier for the piece of content having a particular inode, and wherein resolving further includes identifying when the file is received as an imported file from an external system and performing a search identifying a percentage of file matches for search results from the search as ancestors for the imported file, each ancestor identified as an unconfirmed ancestor to the imported file;
    accessing a database using the one or more content identifiers and the instance identifier; and
    providing, via the interface, one or more tracing maps for the piece of content to the user and automatically creating a versioning system for the piece of content based on the unique instance identifier, and wherein each piece of content is ranked based at least in part on a total number of backlinks associated with that piece of content.

12. The method of claim 11 further comprising, enabling the one or more tracing maps to be interactive and permitting nodes of the map to be activated by the user to jump directly to a different piece of content.

13. The method of claim 11 further comprising, permitting the user to execute searches against all or selective parts of the one or more tracing maps.

14. The method of claim 11 further comprising, generating a textual timeline with descriptive information for the one or more tracing maps as a genealogy report for the piece of content.

15. The method of claim 11 further comprising, providing rankings with each node of the one or more tracing maps, each ranking identifying a percentage of relevance a particular node has to the piece of content.

16. The method of claim 11, wherein presenting further includes presenting the interface as a world-wide web (WWW) accessible web page from an Internet portal.

17. The method of claim 11, wherein resolving further includes searching the database based on extracted keywords from the piece of content to find the one or more content identifiers when metadata associated with the piece of content supplied in the interface lack the one or more content identifiers.

18. A multi-processor implemented system, comprising:
    a server machine having multiple processors; and
    the server machine configured with and to execute a server agent and to interact with one or more client agents executing on one or more client machines;
    the server agent configured to interact with each client agent to supply each piece of content being manipulated on a particular client machine with one or more content identifiers, a unique instance identifier, content metadata, and instance metadata, and the server agent further configured to maintain a database to link the content identifiers and instance identifiers to other pieces of content managed in the database to create traceability for content using inodes of the identifiers and pathnames for the identifiers, the instance identifiers used for automatically creating a versioning system for each piece of content, each piece of content is ranked based at least in part on a total number of backlinks associated with that piece of content, and wherein the server agent further configured to search an external system when a particular piece of content is identified as an imported piece of content to identify a percentage of content matches for search results from the search as ancestors for the imported piece of content, each ancestor identified as an unconfirmed ancestor to the imported piece of content.

19. The system of claim 18, wherein the server agent is further configured to generate tracing maps from the database for a given piece of content.

20. The system of claim 19, wherein the server agent is further configured to interact with an interface presented by the server to a user to receive the given piece of content and to present the tracing maps within the interface.

* * * * *